318-135 CROSS REFERENCE SEARCH ROOM
DYNAMICALLY REBALANCED SERVOSYSTEM ADAPTED FOR LIQUID LEVEL CONTROL
Filed March 2, 1959
2 Sheets-Sheet 1
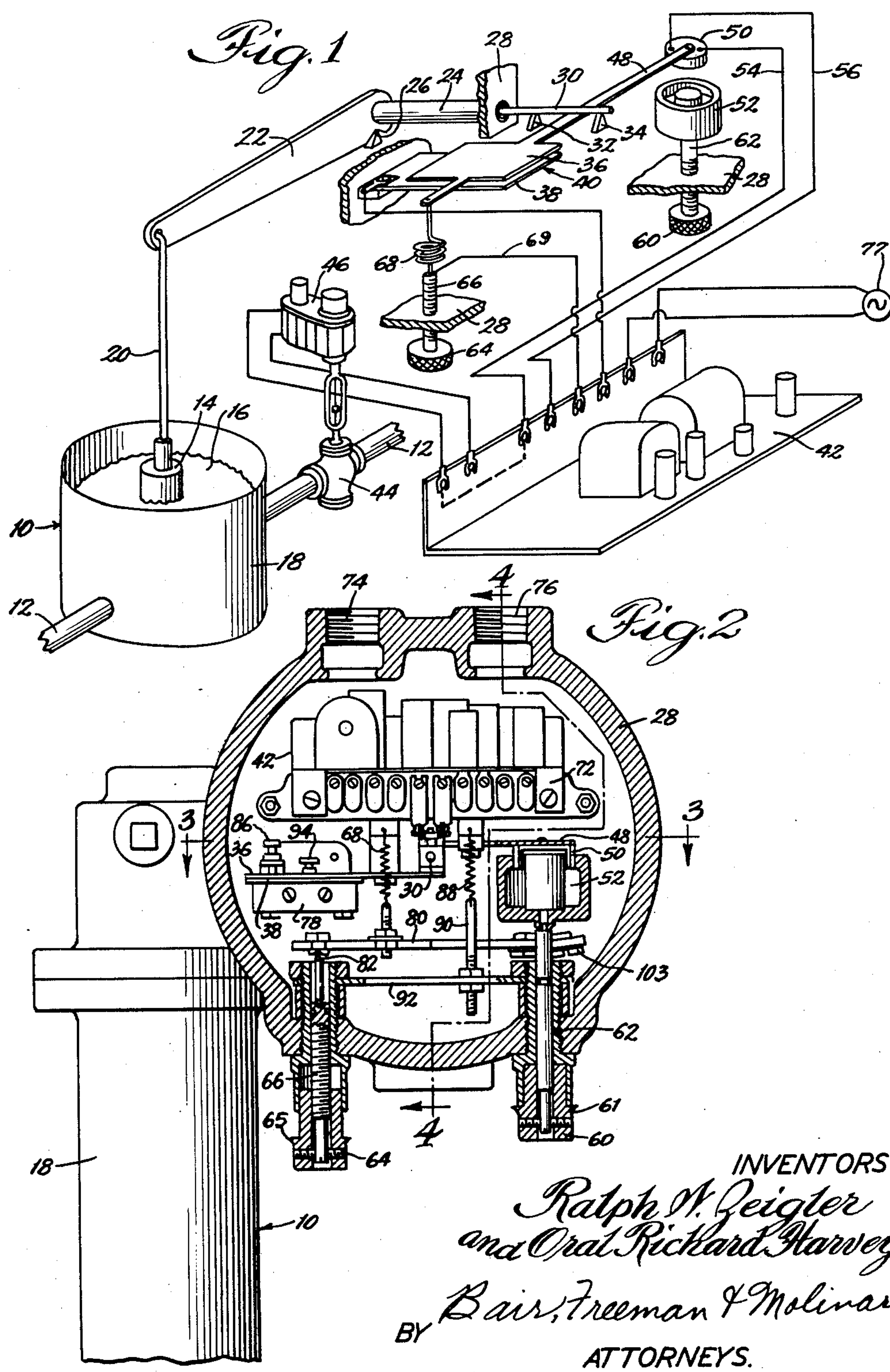

DYNAMICALLY REBALANCED SERVOSYSTEM ADAPTED FOR LIQUID LEVEL CONTROL
Filed March 2, 1959 2 Sheets-Sheet 2
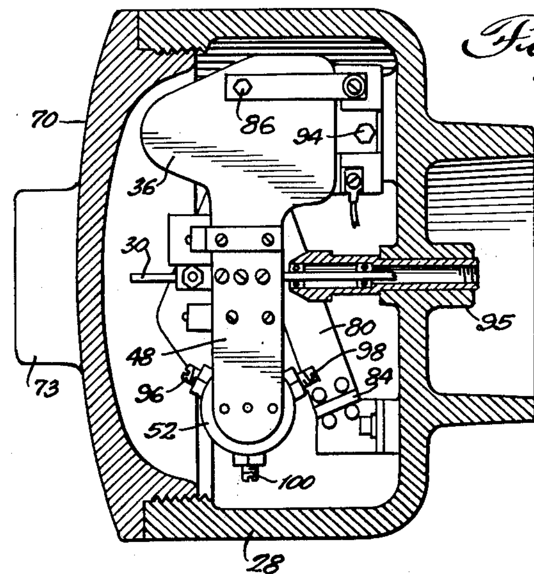
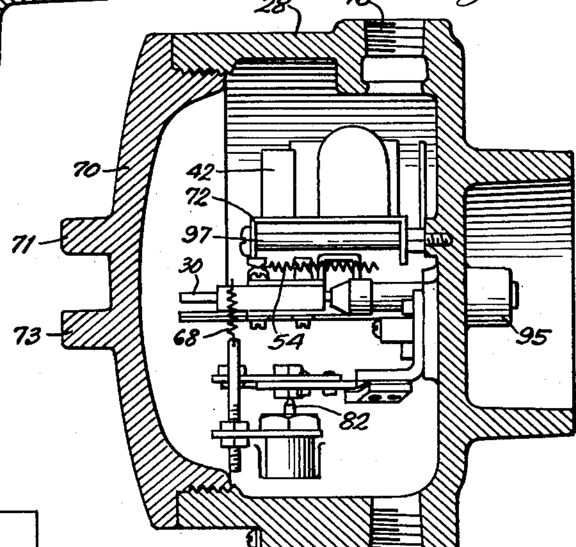
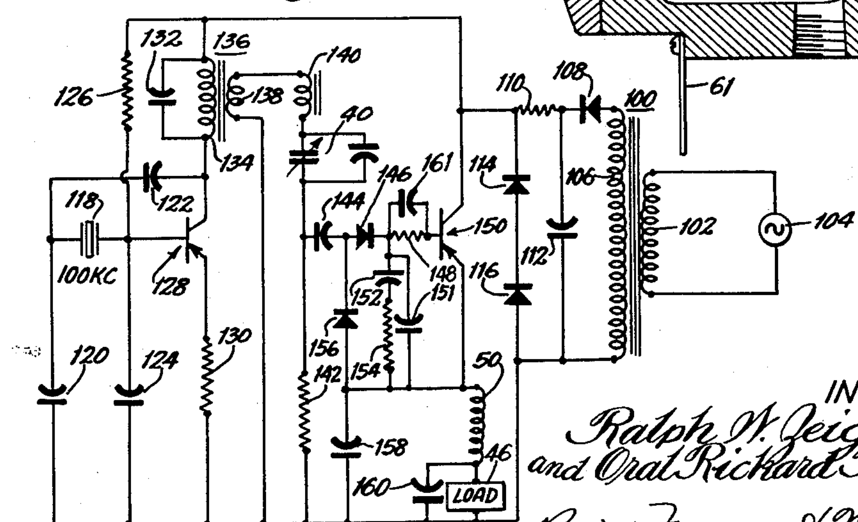
INVENTORS:
Ralph W. Zeigler
and Oral Rickard Harvey,
BY Bair, Freeman & Molinare
ATTORNEYS.

United States Patent Office 3,041,512 Patented June 26, 1962

3,041,512 DYNAMICALLY REBALANCED SERVOSYSTEM ADAPTED FOR LIQUID LEVEL CONTROL

Ralph W. Zeigler and Oral Richard Harvey, Marshalltown, Iowa, assignors to Fisher Governor Company, a corporation of Iowa Filed Mar. 2, 1959, Ser. No. 796,544
13 Claims. (Cl. 318—22)

This invention relates generally to fluid responsive control systems, and more particularly to a new and improved electronic apparatus for fluid measurement and control.

For purposes of illustration, the invention will be described herein as applied to liquid level measurement and control, but it will be obvious to those skilled in the art as the description progresses, that the invention is not limited thereto, and may respond to and control many other types of fluids and conditions.

It is a general object of this invention to provide a new and improved electronic control system. More specifically, it is one object of this invention to provide an electronic control system which is particularly useful in the field of liquid level measurement and control.

It is another object of this invention to provide such an electronic system which advantageously may be used with displacement type float measuring elements.

It is still another object of this invention to provide electronic fluid measurement and control apparatus, as described above, which includes a transistorized, plug-in electronic converter circuit assembly adapted to provide an electrical output signal proportional to thte fluid condition measured.

It is a further object of this invention to provide an electronic control circuit, as described above, which includes a pair of flat metallic plates defining a capacitor in which the position of one of said plates with respect to the other is varied in accordance with the condition being measured to vary the electrical output signal in a corresponding manner.

It is a still further object of this invention to provide a control circuit for float measurement which is positioned within an explosion-proof casing, and with a plurality of selectively operated adjustments for said control circuit positioned external to said casing.

It is still another object of this invention to provide such selectively operated adjustments, as described above, which includes a proportional band adjustment adapted to be adjusted by changing the position of a magnet in the control circuit and a level setting adjustment which is operable from outside the case to vary the tension on a beam connected to one capacitor plate inside of the case.

It is still another object of this invention to provide electronic apparatus for float measurement and control, as described above, which is characterized by its sensitivity, its reliability, and its dependability of operation.

With these and other objects in view, the invention consists in the construction, arrangement, and combination of parts of the apparatus whereby the objects contemplated are obtained, as hereinafter more fully set forth, pointed out in the claims and illustrated in the accompanying drawing wherein:

FIGURE 1 is a combination pictorial and schematic diagram of an electronic fluid level control embodying the invention and illustrative of the operation thereof;

FIGURE 2 is an elevational view, partially in cross-section, of a displacement float cage and a fluid level responsive controller embodying the present invention;

FIGURE 3 is a cross-sectional view of the fluid level responsive controller taken along line 3—3 of FIGURE 2;

FIGURE 4 is a cross-sectional view of the fluid level responsive controller taken along line 4—4 of FIGURE 2; and FIGURE 5 is a schematic diagram of an illustrative electronic converter circuit which advantageously may be embodied in the present invention.

Referring now to the drawing for a detailed description of the invention, and more particularly to FIGURE 1 thereof, the numeral 10 designates a liquid level measuring device which conveniently may be used to control the level of the liquid in a suitable tank or vessel (not shown) adapted to be connected to the device 10 by means of the conduit 12.

A measuring element, which advantageously takes the form of a displacement type float 14 is placed within the liquid 16 contained within the float cage 18 of the liquid level measuring device 10. The float 14 is pivotally connected by means of a vertical member 20 to one end of a float rod 22, the other end of which is secured at right angles to a hollow tube (hereinafter called a torque tube) 24. Float rod 22 and torque tube 24 are supported on a knife edge bearing 26 to provide essentially friction-free operation of the float rod and torque tube in response to the rise and fall of the float 14 with the level of the liquid 16 in the float cage 18.

The end of the torque tube 24 remote from the float rod 22 is connected to a wall of the controller case 28. As one end of torque tube 24 is rigidly attached to the float rod 22, it will be subject to a torsional force of the vertical motion of float 14 and float rod 22. This torsional force or mechanical twisting of the torque tube 24 is utilized by positioning a solid shaft torque rod 30 within the hollow torque tube 24 with one end of the torque rod 30 being securely affixed to the torque tube 24 at the float rod end of the latter. Advantageously, this construction permits the torque rod 30 to turn as the torque tube 24 twists in response to the vertical movement of the float 14, and the amount of turning of the torque rod 30 will be proportional to the amount of the twist of the torque tube 24.

Conveniently, the torque rod 30 extends beyond the torque tube 24 and the end of the controller case 28, and this extension is supported on a pair of bearings 32 and 34, respectively, which may take the form of stainless steel balls or knife edges, as desired. A flat metallic plate 36 is connected to the torque rod 30 so that rotary motion of the torque rod varies the position of the metallic plate 36. A second flat metallic plate 38 is positioned in spaced relation with the first metallic plate 36, and is fixed in position, as by securing metallic plate 38 to an end of the controller case 28. Those skilled in the art will readily appreciate that the two flat metallic plates 36 and 38 define a capacitor 40, which in accordance with the invention, comprises the sensing element of the control loop. As described in greater detail below, the capacitor 40 is electrically connected to an electronic converter 42 and the varying air gap between the capacitor plates 36 and 38 changes the capacitance of the electronic converter circuit as determined by the rotary motion of the torque rod 30 in response to the movement of the liquid float 14.

The electronic converter 42 is electrically connected, in the illustrative embodiment of FIGURE 1, to the control valve actuator 46 of an electro-hydraulic motor valve 44 which operates to control the flow of liquid through the conduit 12. The control valve actuator 46 is operatively associated with the valve 44 for opening and closing the valve in amounts determined by the D.C. output signal applied to the actuator 46 from the electronic converter 42. As explained in greater detail below, the electronic converter 42 acts to send a D.C. milliampere signal proportional to the liquid level to the control valve actuator 46 to position the control valve 44 for the new liquid level conditions.

A feedback coil beam 48 is connected at one end thereof to the torque rod 30 for movement therewith and at the other end thereof to a feedback coil assembly defining a force motor coil 50 which is adapted to be surrounded by a sheet type core assembly 52. The force motor coil 50 is connected by the leads 54 and 56 to the electronic converter 42 and in accordance with the invention, the D.C. output current from the electronic converter is sent through the force motor coil.

Those skilled in the art will readily appreciate that any change in the output current from the electronic converter 42 will cause a corresponding change in the resultant magnetic field surrounding the coil 50. With direct action on the controller, the magnetic fields of the coil 50 and of the magnet 52 are made to repel one another. Thus, the higher the D.C. output current from the electronic converter 42 flowing through the coil 50, the more the coil 50 will tend to be forced out of the magnet assembly 52.

Conversely, as the converter output current decreases, the coil 50 will be moved closer to the magnet assembly 52. This force change then is used to reposition the capacitor plates 36 and 38 by twisting the torque rod 30 in a direction opposite to that of the torque rod twist caused by the movement of the float 14. It now can be appreciated by those skilled in the art that, in accordance with the invention, the force motor coil 50 in conjunction with permanent magnet assembly 52 form the feedback and force balancing element of the controller to thereby insure stable and accurate response to a change in liquid level.

The operation of the electronic control loop shown in FIGURE 1 may be illustrated in the following manner. Assume that the electro-hydraulic control valve 44 has a push-down-to-open inner valve and is controlling the outflow from a liquid storage tank or vessel through the conduit 12. As the liquid level increases in the float cage 18, the buoyant force acting on the displacement float 14 increases, and in accordance with well-known principles, the effective weight of the float 14 decreases.

The torsional force in the torque tube 24 likewise decreases causing the movable capacitor plate 36 of capacitor 40 to move away from the fixed capacitor plate 38. The increase in the air gap between the flat plates 36 and 38 of capacitor 40 decreases the capacitance which the capacitor 40 inserts in the electronic converter circuit 42 and causes the electronic converter to react to this change in a manner which increases the D.C. output signal. The manner in which the electronic converter circuit operates to increase the output signal in response to the movement of the movable capacitor plate 36 is explained in greater detail below with respect to the description of the circuit shown in FIGURE 5 of the drawing.

Upon increase of the D.C. output signal from the electronic converter 42 as described above, the control valve actuator 46 is operated to open the electro-hydraulic motor valve 44 and thereby to increase the liquid flow through the conduit 12. Simultaneously, with this operation of the control valve actuator 46, the increased D.C. output signal from the electronic converter 42 is sent through the force motor coil 50, thereby increasing its magnetic field. The effect of this increase in the magnetic field in the force motor coil 50 upon the magnetic field of the permanent magnetic assembly 52 in a greater repelling force, and consequently, the force motor coil 50 is forced upwardly and further away from the permanent magnetic assembly 52. This change in the position of the force motor coil 50 causes a corresponding twist in the torque rod 30 to reduce the gap between the capacitor plates 36 and 38, thereby preventing any further build-up in the D.C. output signal.

It now will be appreciated that the control loop once again is returned to a stable operating state or condition, by virtue of the force motor coil feedback action, but at a resultant higher D.C. signal output, and with the control valve 44 in a different position.

In the above-described illustrative operation, the liquid level was assumed to be increasing in the float cage. For a decreasing liquid level in the float cage, the reverse action takes place. In particular, the float 14 will move downwardly to cause the flat capacitor plates 36 and 38 to come closely together and thereby reduce the air gap therebetween. This serves to increase the capacitance of capacitor 40, which in turn, decreases the D.C. output signal current to the control valve actuator 46 from the electronic converter 42. The decrease in signal current to the control valve actuator 46 causes the electro-hydraulic motor valve 44 to close further and thereby reduce the flow of liquid in conduit 12 from the liquid storage tank.

At the same time, the reduced D.C. output signal current from the capacitor 40 to the force motor coil 50 decreases its magnetic field, and causes it to move toward the permanent magnet assembly 52. Through the resultant motion of the feedback coil beam 48, the capacitor plate 36 is moved relative to capacitor plate 38 to prevent any further decrease in the output current, and once again, the system has returned to its stable state, but at a lower current output and with the control valve in a different position.

In accordance with a highly advantageous feature of the invention, substantially all of the elements comprising the control system are positioned within an explosion-proof controller case 28 with only the proportional band and level setting adjustments mounted external to the case to facilitate such adjustment without removing the case cover plate. Adjustments for proportional band settings over a large range, as for example from 10–100%, can be met without removing the case cover plate by means of the proportional band adjustment knob 60 secured to one end of the adjustment assembly screw 62 threadedly positioned through the bottom of the case 28. The other end of the proportional band adjustment assembly screw is connected to the permanent magnet assembly 52 and it can be seen that proportional band change is accomplished by rotating knob 60 to selectively position the magnet assembly 52 with respect to the force motor coil 50, thereby changing the magnitude of the resultant magnetic field surrounding the coil 50. Advantageously, a calibrated scale 61 is operatively associated with the proportional band adjustment knob and assembly screw to indicate the proportional band setting.

The invention also comprises a simple and effective level position adjustment which enables an operator to change the level of the liquid in the tank or vessel. Like the proportional band adjustment, the level position adjustment comprises a knob 64 which is secured to one end of a level adjustment assembly screw 66 threadedly positioned through the bottom of the case 28. The other end of the level adjustment assembly screw 66 is connected to one end of a zero spring 68, the other end of the zero spring being rigidly attached to the movable capacitor plate 36. The movable capacitor plate 36 is electrically connected to the electronic converter 42 through a lead wire 69 shown as connected to the junction of zero spring 68 and adjusting screw 66 in FIGURE 1, and the zero spring advantageously serves to prevent the wire 69 from having any effect on the movement of the capacitor plate 36.

In accordance with the invention, the liquid level setting may be increased by rotating the adjusting knob 64 in a counter-clockwise direction as shown in FIGURE 1, increasing the tension on the zero spring 68. Consequently, a higher liquid level will be attained before the movable capacitor plate 36 can overcome the added spring force to move away from the fixed capacitor plate 38 and cause an increase in the output signal. Conversely, the liquid level is lowered by reducing the tension in the zero spring 68 as by rotating the level adjustment knob 64 in a clockwise direction as shown in FIGURE 1, that is, by moving the liquid level adjustment screw 66 up into the case 28.

The physical construction of a preferred embodiment of the invention is shown in FIGURES 2, 3, and 4 of the drawing. Advantageously, the compact controller case 28 is of explosion-proof construction and thus is adapted for use in hazardous locations. Conveniently, the controller case 28 may be constructed of a suitable metal, such as aluminum, and the screw-on cover plate 70 for the controller case may be formed of cast iron or the like. If desired, the cover plate 70 may be provided with two heavy lugs 71 and 73 to facilitate removal and assembly of the cover plate.

In accordance with an important feature of this invention, all component parts of the controller, with the exception of the external adjustments for proportional band and level setting, are mounted inside the controller case 28. As clearly shown in FIGURES 2 and 4, a terminal strip 72 is located in the upper part of the case 28 directly beneath the conduit openings 74 and 76. Two conduit openings are provided for the controller, one for the alternating current supply 77 to the unit, and the other for the direct current output. The electronic converter assembly 42 is mounted adjacent the terminal strip 72, and advantageously, the electronic converter assembly is of the plug-in type to permit a quick change of converters if trouble is suspected or is located at this point. In one preferred embodiment of the invention, the miniature components of the converter, such as the transistors, diodes and the like, were mounted on an epoxy-glass printed circuit thereby eliminating trouble prone wiring and leads. As a result of this construction, only two lead wires are required inside of the controller case 28, namely, the wires which connect the terminal strip 72 to the fixed and movable capacitor plates, 38 and 36, respectively.

As shown in FIGURE 2, the fixed capacitor plate 38 is secured to the controller case 28 by means of the capacitor plate base 78, and the movable capacitor plate 36 is connected to the torque rod 30. The connection from the movable capacitor plate 36 to the terminal strip 72 is made through a zero spring 68 to prevent the lead wire from having any effect on the movement of the capacitor plate 36. Thus, the zero spring 68 is connected to the zero beam 80 which rests at one end thereof on a zero setting pivot 82 supported by the level setting adjustment screw 66 and at the other end thereof on a flexure strip 84, as shown in FIGURE 3 of the drawing. In the operation of the invention, the flexure strip 84 permits vertical motion of the zero beam 80 as the level setting adjustment screw 66 is turned by rotation of the level setting knob 64.

Those skilled in the art will readily appreciate that vertical movement of the zero beam 80, in response to rotation of knob 64, serves to put more or less tension in the zero spring 68 depending upon whether the liquid level is being raised or lowered. The liquid level may be increased by lowering the level setting adjusting knob 64 out of the case 28 to increase the tension on the zero spring 68. Consequently, a higher liquid level need be attained before the movable capacitor plate 36 can overcome the added spring force to move away from the fixed capacitor plate 38 and causes an increase in the output signal. Conversely, the liquid level is lowered by reducing the tension in zero spring 68, as by rotating knob 64 to move the level setting adjustment screw 66 further up into the case 28.

Advantageously, a mechanical stop adjusting screw 86 is located inside the case adjacent the capacitor 40 to limit the distance of travel of plate 36 relative to plate 38. The stop screw 86 may be adjusted before installation of the controller so that the sensed capacitance cannot, in operation, decrease below the capacitance which results in maximum current output.

In addition to the zero spring 68, a bias spring 88 is provided to control the leverage action of the zero beam 80 inside the case when a level setting change is desired. The bias spring 88 is connected at its lower end to the mounting member 90 which is securely attached to the bias spring beam 92. In the operation of the invention, the zero spring 68 and the bias spring 88 serve to keep the radial load on the beam bearings and this keeps the beam from having any movement other than rotary movement in adjusting the tension of the zero spring in response to rotation of the level setting adjustment screw.

Advantageously, the capacitor plates 36 and 38 are provided with insulating coatings on their surfaces to prevent electrical contact between the plates. Also, a capacitor plate adjustment screw 94 is provided as a means for mechanically adjusting the orientation of the fixed capacitor plate 38 so that it is parallel to the movable capacitor plate 36.

The force motor coil 50 is mounted on a feedback coil beam 48 which advantageously may be formed of epoxy-glass laminate. This construction not only simplifies manufacture and decreases the mass of the beam assembly, but further, it provides a maximum amount of insulation between the force motor coil winding and the ground potential. Further, the force motor coil 50 is connected to the terminal strip 72 through spring type leads 54 and 56, which are of light tension and serve to prevent interference with the movement of the beam 48 that otherwise might result from the use of wires.

As described heretofore, proportional band adjustment is provided by rotation of the proportional band adjustment knob 60 which in turn, changes the position of the magnet assembly 52. It is a feature of this invention, that the proportional band may be calibrated by means of the magnetic shunt trimmer screws 96, 98 and 100 shown as surrounding the magnet assembly 52 in FIGURE 3 of the drawing.

An illustrative electronic converter circuit is shown in FIGURE 5 of the drawing. As described heretofore, the electronic converter receives a change in sensed capacitance from the capacitor plates 36 and 38 in response to changes in liquid level, and converts this change to a direct current output change for controlling the electrohydraulic valve 44 that controls fluid flow in the illustrative embodiment of the invention.

The electronic converter 42 comprises five basic sections, namely, a power supply section, an oscillator section, a series resonant sensing circuit, a rectifier, and a direct current amplifier. The power supply uses a transformer 100, the primary winding 102 of which is connected to a suitable source of A.C. supply voltage 104. The secondary winding 106 of transformer 100 is connected through a diode 108 and filter circuit comprising resistance 110 and capacitor 112 to a pair of series connected Zener diodes 114 and 116 which serve to regulate the D.C. output voltage rectified by diode 108 and smoothed out by the resistance-capacitor filter circuit.

The regulated D.C. voltage output of the power supply is applied to an oscillator comprising a crystal 118, one terminal of which is connected to the capacitors 120 and 122, and the other terminal of which is connected to the capacitor 124, the resistance 126, and the base electrode of a silicon transistor 128. The emitter electrode of transistor 128 is connected to the resistance 130 and the collector electrode of the transistor 128 is connected to the capacitor 122 and to the parallel circuit of the capacitor 132 and the inductance coil 134 of transformer 136.

The crystal controlled oscillator causes a high frequency alternating current voltage, for example, a 100 kc. crystal may be used, to be present on the primary winding 134 of transformer 136. A portion of this voltage is induced in the secondary winding 138 of the transformer. Secondary winding 138 is connected in circuit with a series resonant circuit including the inductance 140 and the capacitor 40 which comprises the flat capacitor plates 36 and 38 defining the sensing element of the circuit. Capacitor 40 is connected to the junction of the resistance 142 and the capacitor 144.

Those skilled in the art will readily appreciate that when the inductive and capacitive reactances of resonant circuits are equal to each other, the total resultant impedance is substantially zero and therefore, the current flow through the resistance 142 is at a maximum. Thus, for example, when the capacitance of the sensing capacitor 40 increases, the capacitive reactance decreases and therefore, the total resultant impedance becomes greater because the total impedance is the difference between the capacitive and inductive reactances of the series resonant circuit.

The effect of this change in the alternating current flow through this circuit is amplified by a direct current amplifier after rectification by suitable diodes. Thus, the output of the series resonant circuit is applied through the capacitor 144, the input diode 146 and the parallel circuit comprisping capacitor 161 and resistance 148 to the base electrode of a silicon transistor 150. The diode 146 also is connected to a capacitor 151 and to the series circuit of capacitor 152 and resistance 154, the other end of which is connected to the emitter electrode of transistor 150. A diode 156 is connected between capacitor 144 and the emitter electrode of the transistor 150. In addition, the emitter electrode of the transistor 150 is connected to a capacitor 158 and through the winding of force motor coil 50 and the load 46, which advantageously may be the controller valve actuator, to the common return of the circuit. A capacitor 160 advantageously is connected across the load 46. The collector electrode of the transistor 150 is returned to the output of the power supply rectifier.

In accordance with a feature of this invention, the capacitor 161 connected across base resistor 148, the capacitor 160 connected across load 46, and the series connected capacitor 156 and resistor 154 connected across diodes 146 and 156 make up a damping network which provides more stable operation and greater speed of response for the electronic converter circuit. This damping network advantageously serves to prevent any tendency of the controller to cycle continuously.

In the operation of the electronic converter circuit, movement of the capacitor plate 36 with respect to the fixed capacitor plate 38 causes an unbalance in the condition of the circuit and thus this unbalance results in a change in current at the output of the D.C. amplifier transistor 150 which flows through the force motor coil 50 in the controller and the valve actuator controller 46 to vary the valve position in a corresponding manner.

Those skilled in the art will readily appreciate that if, in the sensing circuit, the inductive and capacitive reactances of the series resonant circuit are equal, either an increase or a decrease in the capacitance results in a decrease in current. In the controller comprising the present invention therefore, the circuit is adjusted so that an increase in capacitance (decrease in plate spacing) will cause a decrease in current output. Reversal of this action would tend to reduce linearity and stability.

The electronic converter assembly 42 comprises components such as diodes, silicon transistors, a crystal, condensers, resistors, and special ferrite core inductance coils which are all chosen for their high degree of dependability. In an electronic liquid level controller constructed in accordance with the invention, an output current of 1 to 5 milliamperes D.C. was delivered through a 3,000 ohm load with a resolution sensitivity of .02%, a linearity within 1% of 4 milliampere change at 100% proportional band, and a hysteresis characteristic of less than .25% of a 4 milliampere output change at 100% proportional band.

While we have shown and described a specific illustrative embodiment of the invention, to illustrate the principles thereof, it will be appreciated by those skilled in the art that modifications may be made in the construction and arrangement of the above-described controller without departing from the real spirit and purpose of the invention, and that it is intended to cover by the appended claims any modified forms of structure, circuitry or use of equivalents, which may reasonably be made within their scope.

What is claimed as the invention is:

1. In a system comprising electrically operated means adjustable to effect the magnitude of a condition and a primary control member positioned in accordance with the existing magnitude of the condition, the improvement of control means responsive to the position of the primary control member transmitting electrical control signals to said electrically operated means comprising a signal generator circuit, capacitance means for varying the output of said signal generator circuit including a pair of flat, spaced apart, metallic plates defining a capacitor, one of said plates being fixed in position and the other of said plates being supported by a balance beam for enabling said other plate to be moved relative to the fixed plate, said balance beam being linked to said primary control member for causing the movable capacitor plate to be adjusted relative to said fixed plate in accordance with the movement of said primary control member whereby said signal generator circuit provides control signals to said electrically operated means which are determined by the change in position of said primary control memger, and feed-back means for restoring the system to a balanced condition after each movement of the primary control member comprising a force motor including a magnet assembly, and electrically energizable coil operatively associated with said magnet assembly, said coil being supported by said balance beam and connected to receive the control signals from said signal generator circuit whereby movement of said force motor coil relative to said magnet assembly in response to said control signals moves said balance beam to return the movable capacitor plate to approximately its initial position relative to said fixed capacitor plate, thereby returning the system to a balanced condition.

2. The improvement of control means responsive to the position of a sensing element for transmitting electrical control signals comprising a housing having mounted therein a signal generator circuit, capacitance means for varying the output of said signal generator circuit including a pair of flat, spaced apart, metallic plates defining a capacitor, means affixing one of said plates to said housing, a balance beam supporting the other of said plates for enabling it to be moved relative to the fixed plate, said balance beam being linked to the sensing element by a torque rod extending through an opening in said housing for causing the movable capacitor plate to be adjusted relative to said fixed plate in accordance with the movement of the sensing element whereby said signal generator circuit provides control signals which are determined by the change in position of the sensing element, and feed-back means for restoring the system to a balanced condition comprising a magnet assembly and a feed-back coil assembly supported by said balance beam and connected to receive the control signals from said signal generator circuit whereby movement of said feed-back coil assembly relative to said magnet assembly as determined by said control signals moves said balance beam to return the movable capacitor plate to approximately its initial position relative to said fixed capacitor plate, thereby returning the system to a balanced condition.

3. Control means in accordance with claim 2 which further comprises selectively operable means for proportional band adjustment and liquid level setting adjustment located outside of said housing for enabling said adjustments to be made without requiring said housing to be opened.

4. Control means in accordance with claim 3 wherein said proportional band adjustment comprises a rotatable shaft threadedly supported in a wall of said housing and connected at its interior end to said magnet assembly whereby the proportional band of the controller is adjusted by changing the position of the magnet assembly relative to said feed-back coil assembly in response to the selective rotation of said shaft.

5. Control means in accordance with claim 3 wherein said liquid level setting adjustment comprises a rotatable shaft threadedly supported in a wall of said housing and connected at its interior end to spring biasing means for said movable capacitor plate whereby the liquid level setting of the controller is adjusted by changing the spring bias tension on the movable capacitor plate in response to the selective rotation of said shaft.

6. The improvement of control means responsive to the position of a sensing element for transmitting electrical control signals comprising a signal generator, capacitance means for varying the output of said signal generator including a fixed metallic plate and a movable metallic plate supported by a balance beam, said balance beam being linked to the sensing element for causing the movable capacitor plate to be adjusted relative to said fixed plate in accordance with the movement of the sensing element whereby said signal generator provides control signals determined by the change in position of the sensing element, and feed-back means for restoring the system to a balanced condition after each movement of the sensing element comprising a magnet assembly and a feed-back coil assembly supported by said balance beam and connected to receive the control signals from said signal generator whereby movement of said feed-back coil assembly relative to said magnet assembly as determined by said control signals moves said balance beam to return the movable capacitor plate to approximately its initial position relative to said fixed capacitor plate, thereby returning the system to a balanced condition.

7. In a system comprising electrically operated means adjustable to effect the magnitude of a condition and a primary control member positioned in accordance with the existing magnitude of the condition, the improvement of control means responsive to the position of the primary control member transmitting electrical control signals to said electrically operated means comprising a signal generator circuit, adjustable means for varying the output of said signal generator circuit including a pair of flat, spaced apart, metallic plates defining a capacitor, means securing one of said plates in fixed position, a balance beam supporting the other of said plates for enabling it to be moved relative to the fixed plate, said balance beam being linked to said primary control member for causing the movable capacitor plate to be adjusted relative to said fixed plate in accordance with the movement of said primary control member whereby said signal generator circuit provides control signals to said electrically operated means which are determined by the change in position of said primary control member, and feed-back means for restoring the system to a balanced condition after each movement of the primary control member comprising a magnet assembly, and a feed-back coil supported by said balance beam and connected to receive the control signals from said signal generator circuit whereby movement of said feed-back coil relative to said magnet assembly as determined by said control signals moves the balance beam to return the movable capacitor plate to approximately its initial position relative to said fixed capacitor plate, thereby returning the system to a balanced condition.

8. A control system for adjusting electrically operated means in response to changes in the position of a sensing element comprising an electronic converter circuit adapted to supply a control signal to the electrically operated means in accordance with changes in sensing element position, said electronic converter circuit including capacitance means for varying the amplitude of the control signal comprising output of a pair of flat, spaced apart, metallic plates, means securing one of said plates in fixed position, means linking the other of said plates to the sensing element for enabling it to be moved relative to the fixed plate in accordance with the movement of the sensing element whereby said electronic converter circuit provides control signals to the electrically operated means which are determined by the change in position of the sensing element, and feed-back means for restoring the system to a balanced condition after each movement of the sensing element by restoring the movable capacitor plate to its initial position relative to said fixed capacitor plate.

9. A control system in accordance with claim 8 wherein said feed-back means comprises a magnet assembly and a feed-back coil operatively associated with said magnet assembly and movable relative thereto in response to the application of said control signal thereto, said feed-back coil being supported at one end of a balance beam, the other end of which is connected to said movable capacitor plate such that movement of said capacitor plate varies the control signal in a direction which causes the feed-back coil to be moved relative to the magnet assembly sufficient to return the movable capacitor plate to its initial position relative to said fixed capacitor plate.

10. A control system in accordance with claim 9 further comprising spring biasing means connected to said movable capacitor plate for placing the latter under tension, and selectively adjustable knob means connected to said spring biasing means adapted when operated to vary the tension on the capacitor plate, thereby varying the level setting of the control system.

11. A control system in accordance with claim 9 further comprising selectively adjustable knob means connected to said magnet assembly and adapted when operated to change the position of said magnet assembly relative to said feed-back coil, thereby varying the proportional band setting of the control system operation.

12. A control system in accordance with claim 9 further comprising magnetic shunt trimmer screw means threadedly positioned in said magnet assembly for effecting proportional band calibration by the selective insertion or removal of said magnetic shunt trimmer screw means relative to said magnet assembly.

13. A control system in accordance with claim 9 further comprising an impact resistant housing enclosing said electronic converter circuit and said feedback means, and selectively adjustable means for varying the system liquid level setting and proportional band setting extending through said housing and operable externally thereof such that said settings may be adjusted without requiring the housing to be opened.

References Cited in the file of this patent

UNITED STATES PATENTS

| | | |
|---|---|---|
| 1,582,715 | Wensley | Apr. 27, 1926 |
| 2,457,792 | Wild et al. | Dec. 28, 1948 |
| 2,467,335 | Rath | Apr. 12, 1949 |
| 2,602,660 | Shannon | July 8, 1952 |
| 2,686,893 | Markson | Aug. 17, 1954 |
| 2,847,625 | Popowsky | Aug. 12, 1958 |
| 2,849,669 | Kinkel | Aug. 26, 1958 |

FOREIGN PATENTS

| | | |
|---|---|---|
| 476,658 | Italy | Dec. 18, 1952 |